US006222879B1

(12) United States Patent
Cideciyan et al.

(10) Patent No.: US 6,222,879 B1
(45) Date of Patent: Apr. 24, 2001

(54) SELF CONTAINED EQUALIZATION METHOD AND APPARATUS

(75) Inventors: Roy D. Cideciyan, Rueschlikon (CH); Jonathan D. Coker, Rochester, MN (US); Evangelos S. Eleftheriou, Zurich (CH); Richard L. Galbraith; John J. Stephenson, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/144,165

(22) Filed: Aug. 31, 1998

(51) Int. Cl.$^7$ ................................................. H04B 15/00

(52) U.S. Cl. ........................... 375/233; 375/350; 708/323

(58) Field of Search ..................................... 375/232, 233, 375/350; 708/301, 319, 320, 322, 323; 360/65; 331/18

(56) References Cited

U.S. PATENT DOCUMENTS

| 5,268,848 | 12/1993 | Coker et al. . |
| 5,426,541 | 6/1995 | Coker et al. . |
| 5,491,518 | * 2/1996 | Kim ..................................... 348/607 |
| 5,590,154 | 12/1996 | Forni et al. . |
| 6,078,614 | * 6/2000 | Brown et al. ........................ 375/232 |

* cited by examiner

*Primary Examiner*—Amanda T. Le
(74) *Attorney, Agent, or Firm*—David W. Lynch; Mark A. Hollingsworth

(57) ABSTRACT

A method and apparatus for automating the convergence of tap weights in an equalizer for a data channel is disclosed. The automated equalization method is contained within the channel and obtains a temporary copy of each of a plurality of current tap weights from a current tap weight memory, determines a direction for modifying the temporary copy of each of the plurality of current tap weights, constrains the modifications to the temporary copy of each of the plurality of current tap weights to produce adjusted tap weights and at the end of a read operation, stores the adjusted tap weights to the current tap weight memory for use during a next read operation. The sign—sign LMS products for each of the plurality of current tap weights is calculated, the sign—sign LMS products for each of the plurality of current tap weights is summed to produce a count and the count for each of the plurality of current tap weights is compared to a threshold produce a desired tap direction indicator for each of the plurality of current tap weights. The desired tap direction comprises a positive value if the count is more positive than the threshold and a negative value is if the count is more negative than the threshold. The summing further includes incrementing the count by +1 if the sign product is positive and by -1 if the sign product is negative. The constraining further includes moving odd/even taps in pairs having opposite signs so that the sum of the odd/even taps is unchanged.

22 Claims, 13 Drawing Sheets

| T₀ | T₂ | T₄ | T₆ | | T₁ | T₃ | T₅ | T₇ |
|---|---|---|---|---|---|---|---|---|
| + | + | | | | | | | |
| − | − | | | | | | | |
| | + | + | | | | | | |
| | − | − | | | | | | |
| | | + | + | | | | | |
| | | − | − | | | | | |
| + | | | + | | | | | |
| − | | | − | | | | | |
| + | | − | | | | | | |
| − | | + | | | | | | |
| | + | | − | | | | | |
| | − | | + | | | | | |
| | | | | | + | + | | |
| | | | | | − | − | | |
| | | | | | | + | + | |
| | | | | | | − | − | |
| | | | | | | | + | + |
| | | | | | | | − | − |
| | | | | | + | | | + |
| | | | | | − | | | − |
| | | | | | + | | − | |
| | | | | | − | | + | |
| | | | | | | + | | − |
| | | | | | | − | | + |

FIG. 8

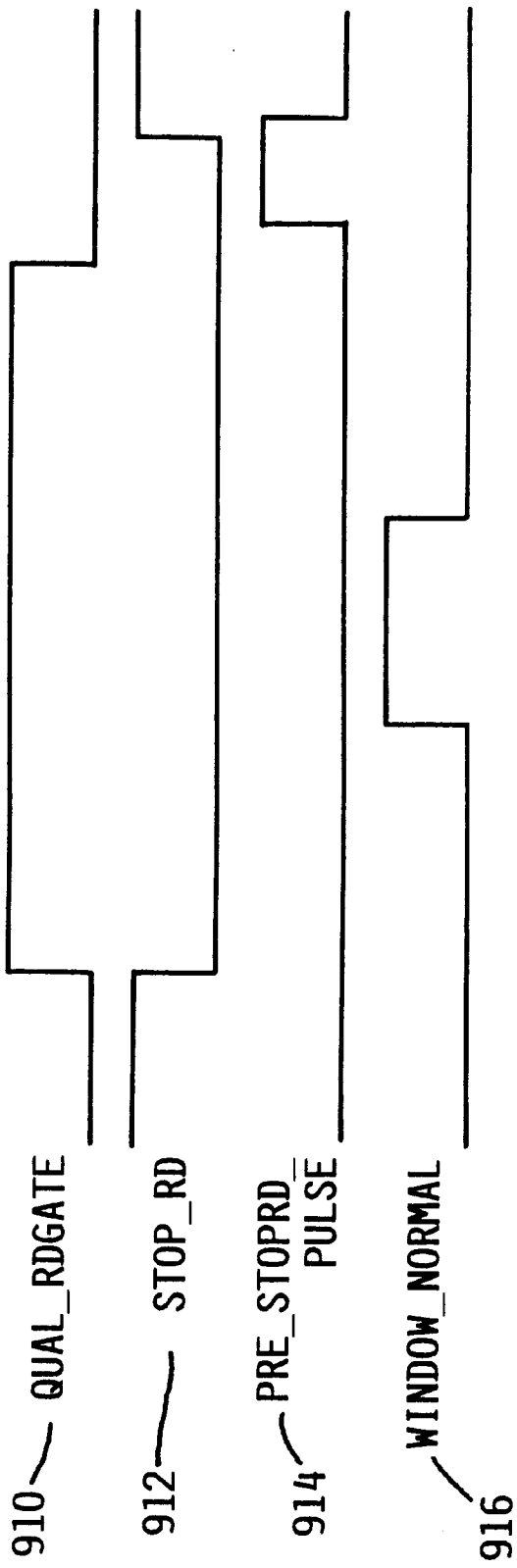

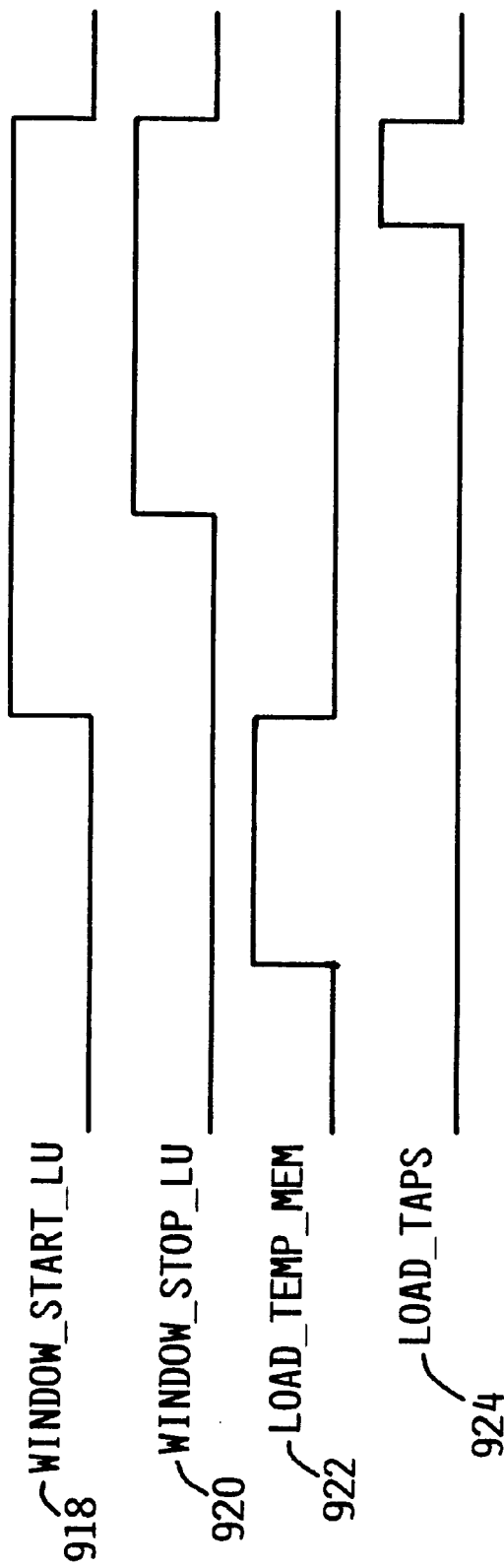

SELF CONTAINED EQUALIZATION METHOD AND APPARATUS

BACKGROUND OF THE INVENTION

1. Field of the Invention.

This invention relates in general to a data channel, and more particularly to a method for automating the convergence of tap weights in an equalizer for a data channel.

2. Description of Related Art.

Computers often include auxiliary memory storage having media on which data can be written and from which data can be read. Disk drive units incorporating stacked, commonly rotated rigid magnetic disks are one example of storage media. Tape drives and optical storage units are other examples of storage media.

In a disk drive, the data are stored in magnetic form on the disk surfaces. Data are recorded in concentric, radially spaced data information tracks arrayed on the surfaces of the disks. Transducer heads driven in a path toward and away from the drive axis write data to the disks and read data from the disks.

To achieve high data density in writing and reading data on storage media a partial response maximum likelihood (PRML) channel is often used. To obtain full advantage of the PRML channel, the received signal or the read signal must be filtered through a specially designed equalizing filter. For example, a common problem encountered when electronically reading or transmitting data is that it becomes corrupted by such things as background noise, impulse noise, fades, etc. Usually this data corruption is statistical phenomenon which causes additive and/or multiplicative transformations to the originally transmitted data. Thus, the original data undergoes changes such as frequency translation, non-linear or harmonic distortion, and time dispersion. In addition, high speed data transmission over channels of limited bandwidth results in a type of distortion commonly referred to as intersymbol interference.

One technique for reducing intersymbol interference includes equalizing the data using an equalizer that compensates for the average of the range of expected channel amplitude and delay characteristics. However, adaptive equalizers suffer from a relatively long convergence time for a least means square (LMS) algorithm. Another limitation of equalizers is that since they are implemented in digital circuitry, the data must be quantized prior to being processed by, for example, a finite impulse response (FIR) filter.

Current method of equalization for PRML channels involve tester software that executes a sequence of steps for optimizing the taps of the filter. For example, a set of tap weights are loaded into a finite impulse response filter (FIR) of the channel. A measurement window is set with a start and stop byte count which defines the data zone that will be used to make a measurement. A read command is then issued to the file. During the read command, the channel measures the mean squared error of the data that is inside the measurement window.

After the read completes, the value of the error is read into the tester software. The tester software then modifies the tap weights using one of several possible convergence methods and re-loads new tap weights into the channel. A new measurement is then made. If the error is smaller, then the new taps are stored and a new trial is attempted. Eventually, the optimum taps are obtained and the algorithm stops.

Nevertheless, this process is complicated and requires a tester to operate. Further the process is time consuming and the tester software must be rewritten for each new product.

It can be seen that there is a need for a simple, automated equalization method.

It can also be seen that there is a need for an automated equalization method that is contained within the channel itself.

SUMMARY OF THE INVENTION

To overcome the limitations in the prior art described above, and to overcome other limitations that will become apparent upon reading and understanding the present specification, the present invention discloses a method for automating the convergence of tap weights in an equalizer for a data channel.

The present invention solves the above-described problems by providing a simple, automated equalization method that is contained within the channel itself.

A method in accordance with the principles of the present invention includes obtaining a temporary copy of each of a plurality of current tap weights from a current tap weight memory, determining a direction for modifying the temporary copy of each of the plurality of current tap weights, constraining the modifications to the temporary copy of each of the plurality of current tap weights to produce adjusted tap weights and at the end of a read operation, storing the adjusted tap weights to the current tap weight memory for use during a next read operation.

Other embodiments of a system in accordance with the principles of the invention may include alternative or optional additional aspects. One such aspect of the present invention is that the determining further includes calculating the sign-sign LMS products for each of the plurality of current tap weights, summing the sign-sign LMS products for each of the plurality of current tap weights to produce a count and comparing the count for each of the plurality of current tap weights to a threshold produce a desired tap direction indicator for each of the plurality of current tap weights.

Another aspect of the present invention is that the desired tap direction includes a positive value if the count is more positive than the threshold and a negative value is if the count is more negative than the threshold.

Another aspect of the present invention is that the summing further includes incrementing the count by +1 if the sign product is positive and by −1 if the sign product is negative.

Another aspect of the present invention is that the constraining further includes moving odd taps in pairs having opposite signs so that the sum of the odd taps is unchanged.

Another aspect of the present invention is that the constraining further includes moving even taps in pairs having opposite signs so that the sum of the even taps is unchanged.

Another aspect of the present invention is that the constraining further includes moving even taps according to −T0+T2−T4+T6=−71 lsbs, wherein Ti represents the ith tap, and wherein the taps are moved in pairs having opposite signs so that the sum of the even taps remains −71 lsbs.

Another aspect of the present invention is that the constraining further includes moving odd taps according to −T1+T3−T5+T7=−71 lsbs, wherein Ti represents the ith tap, and wherein the taps are moved in pairs having opposite signs so that the sum of the odd taps remains −71 lsbs.

Another aspect of the present invention is that a finite impulse response filter is provided that includes a delay line having N−1 delay latches for receiving a data signal and processing the data signal through the N−1 delay latches to produce N sampled signals at N taps, N multipliers, coupled to the N taps of the delay line, for multiplying each of the N sampled signals by a corresponding Nth tap weight to produce a product signal, an adder, coupled to the multiplier, for summing the product signals of the N multipliers to produce an equalized sample and a subtractor, coupled to the adder, for subtracting an ideal equalized sample from the equalized sample to produce an error signal, the error signal being used to set the Nth tap weight for the N multipliers.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 8 is a table illustrating the 24 allowed adjustment combinations; and

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a simple, automated equalization method into the channel hardware. Equalization is performed by turning on a bit in the channel and then reading user data through the channel in the normal way until the FIR tap weights have converged to a stable value. After reaching the stable value the bit is turned back off and the tap weights are read and stored for use during normal file operations.

Figure 1:
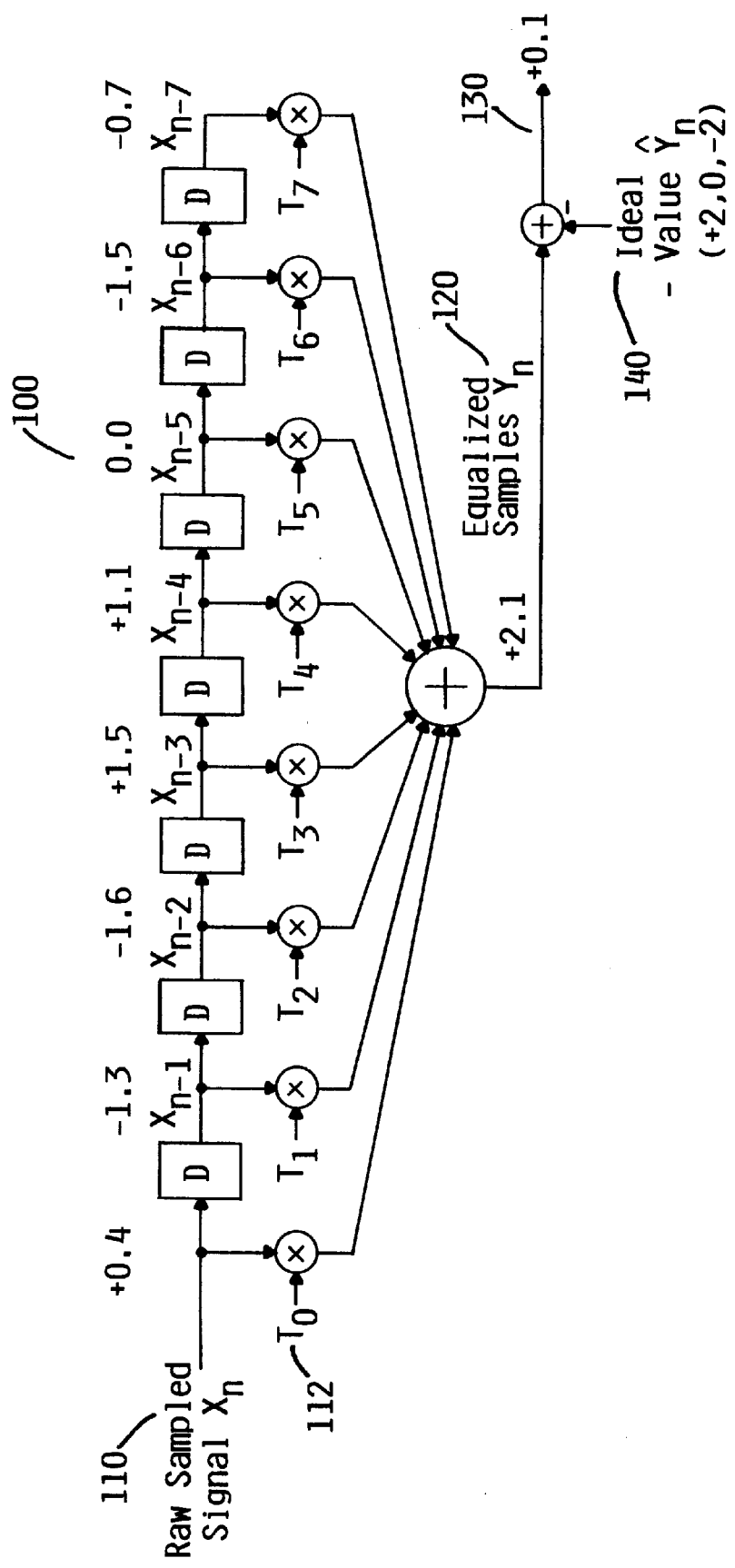
FIG. 1 illustrates an 8 tap FIR filter according to the present invention.

FIG. 1 illustrates an 8 tap FIR filter 100 according to the present invention. The $X_n$ value 110 is the data stream into the filter. The n value used as the index refers to the order of the data value entering the filter. When n is equal to 0, the first data value is being referred to, and when n is equal to N, the last data value going into the FIR filter 100 is being referred to. The $T_i$ values are the filter tap weights 112. The i index denotes the particular tap in the FIR filter 100. When i is equal to 0, the tap weight 112 is multiplied by the most recent sample, and when i equal 7 the tap weight 112 is multiplied by the oldest data value, i.e., the data value is 7 samples old. $Y_n$ 120 is the output of the FIR filter 100. The error signal 130, $e_n$, is the difference between the FIR filter output 120 and a reference value 140. The set of possible reference values 140 are +2, 0, and −2. The selection of the reference values 140 will be discussed in detail below.

Figure 2:
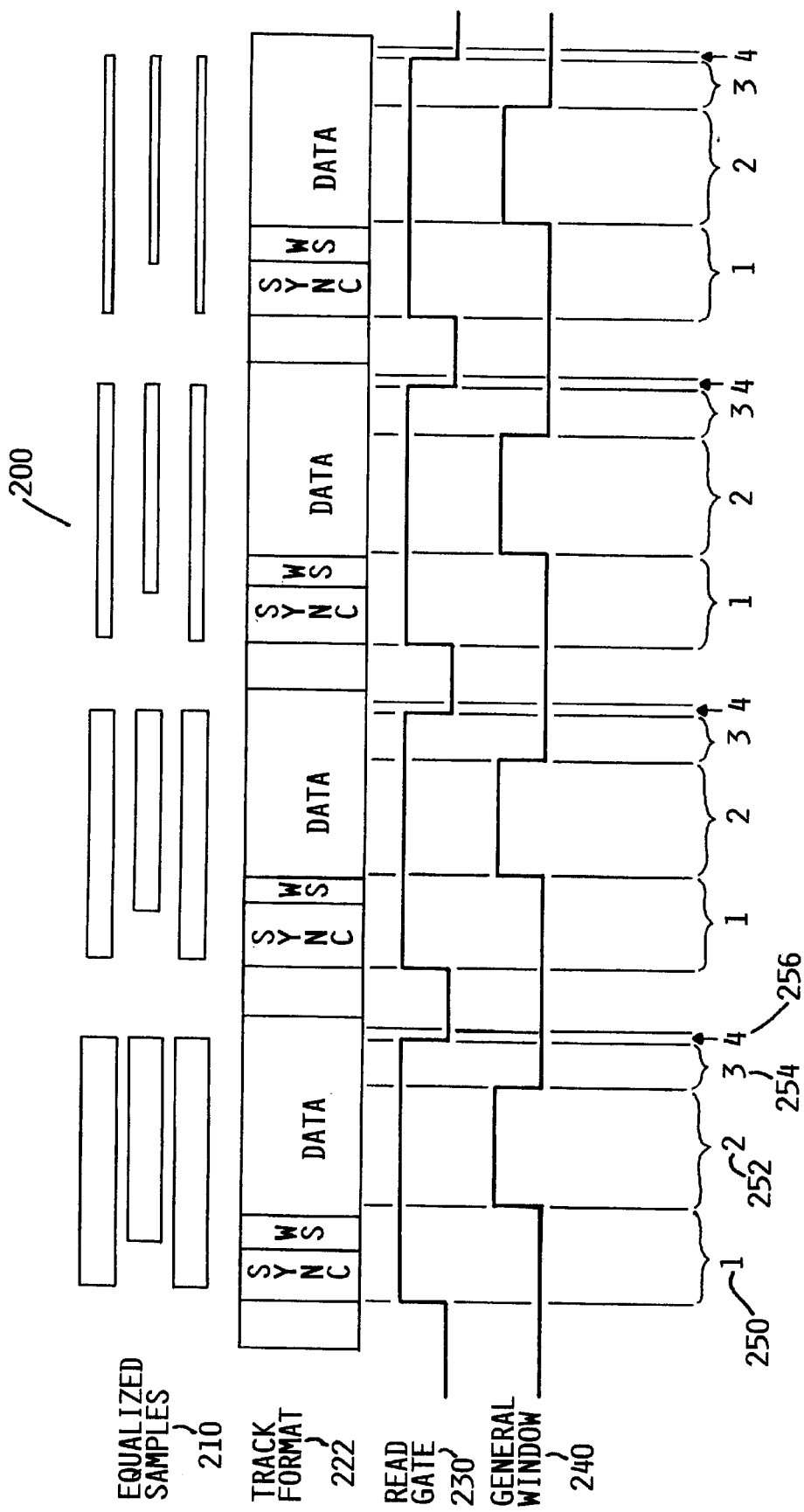
FIG. 2 illustrates the adjustment of the tap weights to the FIR filter after the end of each data read operation according to the adaptive equalization method.

FIG. 2 illustrates the adjustment of the tap weights to the FIR filter after the end of each data read operation 200 according to the adaptive equalization method. In FIG. 2, equalized samples 210, the track format 220, the read gate 230 and the general window 240 are shown. As shown in FIG. 2, the read gate 230 and the general window 240 delineate windows for performing the process steps for each data read operation. In window 1 250, a temporary copy of the tap weights is made from the functioning tap weight memory. In window 2 252, the sign-sign LMS products for each of the eight tap weights are summed in eight separate accumulators. The summing occurs for the duration of the General Window period 240. Comparators at the output of each accumulator are used to determine the Desired Tap Direction (DTD) for each of the eight tap weights. In window 3 254, combinational logic is used to compute the constrained modifications to the temporary copy of the tap weights. Finally, in window 4 256, the modified temporary copy of the tap weights is stored to the functioning tap weight memory.

Figure 3A:
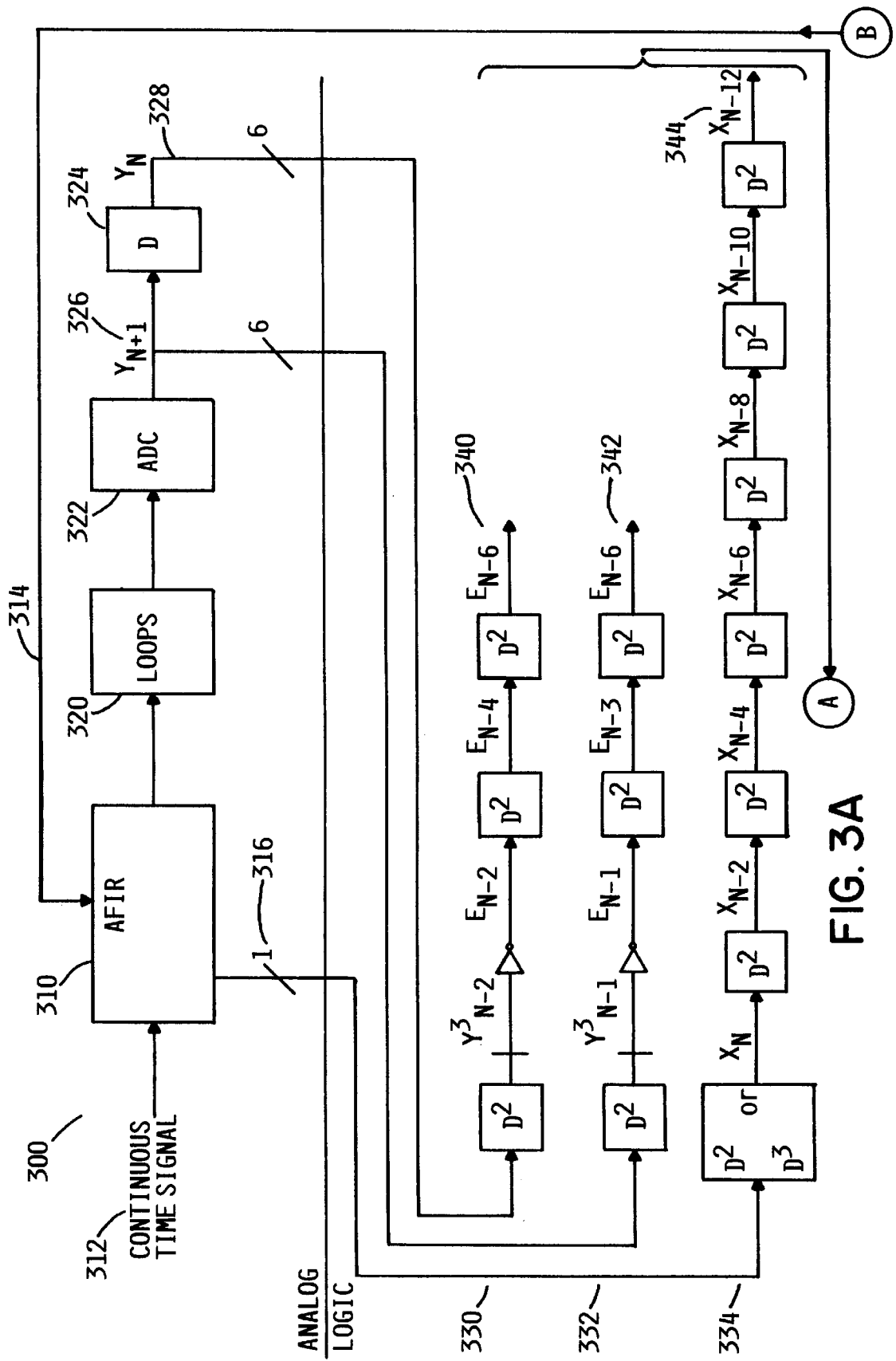
FIG. 3 illustrates a block diagram of the adaptive equalizer.
Figure 3B:
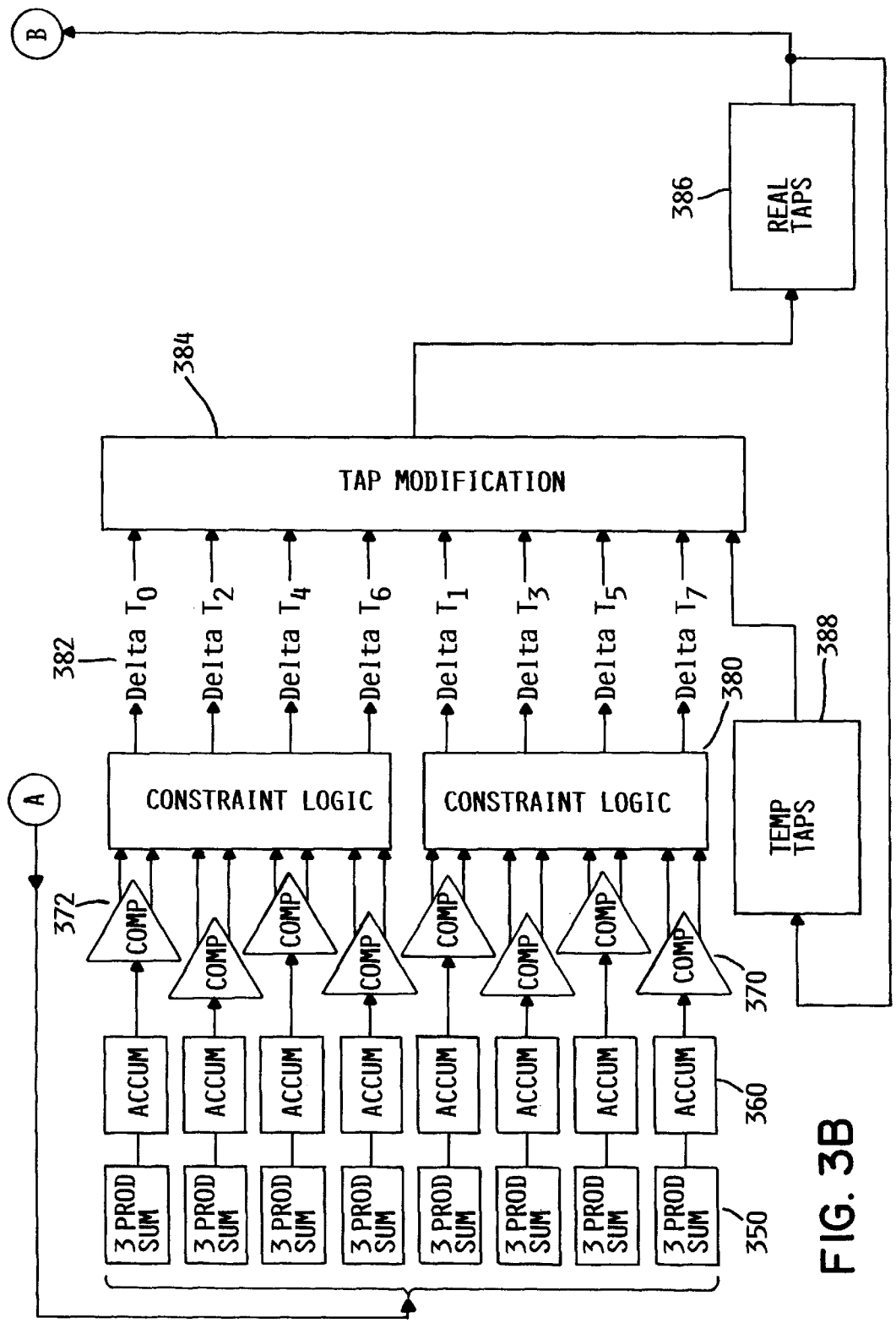

FIG. 3 illustrates a block diagram of the adaptive equalizer 300 according to the present invention. In FIG. 3, the FIR filter 310, in this particular case an analog FIR (AFIR), receives a continuous signal 312 and the tap coefficients 314 for adjusting the tap weights of the FIR filter 310.

The FIR filter 310 generates a 1 bit signal 316 which is the sign of the raw sample. In addition, the FIR generates the error signal 318, which is passed through the timing loops 320 and an analog-to-digital converter (ADC) 322. The output of the ADC 322 is passed through a delay 324. The output 326 of the ADC 322 and the output 328 of the delay 324 are 6 bit signals which are the equalized signals.

Figure 4:
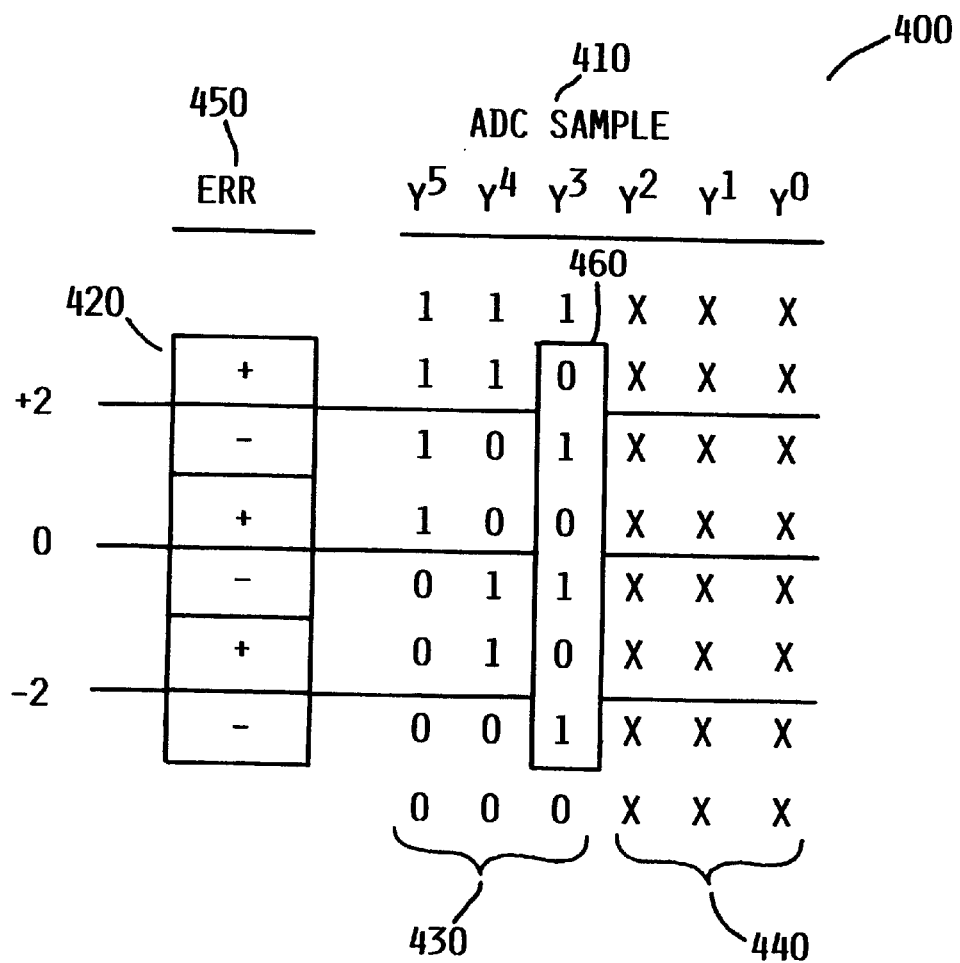
FIG. 4 illustrates the equalizer output error signal.

FIG. 4 illustrates the equalizer output signal 400. As shown in FIG. 4, the bit values of the ADC output 410 are arranged with the signs of the ideal samples 420. Due to the format of the 6 bit number 410, the ideal samples 420 do not actually have to be subtracted. Instead, the value of such a subtraction operation is already represented by one of the six wires providing the six bit ADC output signal 420. Thus, all that is needed is the sign of the equalized signal, not the actual value. More specifically, as shown in FIG. 4, the upper 3 bits 430 are a certain value, e.g., 111, and the bottom 3 bits 440 are any of value so that each row represents 8 codes. The error signal that is desired, i.e., the sign of the error signal (ERR) 450, is the +−+−+−. Thus, the error signal is exactly represented by the inverted version of the third bit 460. Accordingly, there is no need to physically subtract the +2, 0 or −2 because the number system provides it for free.

Figure 5:
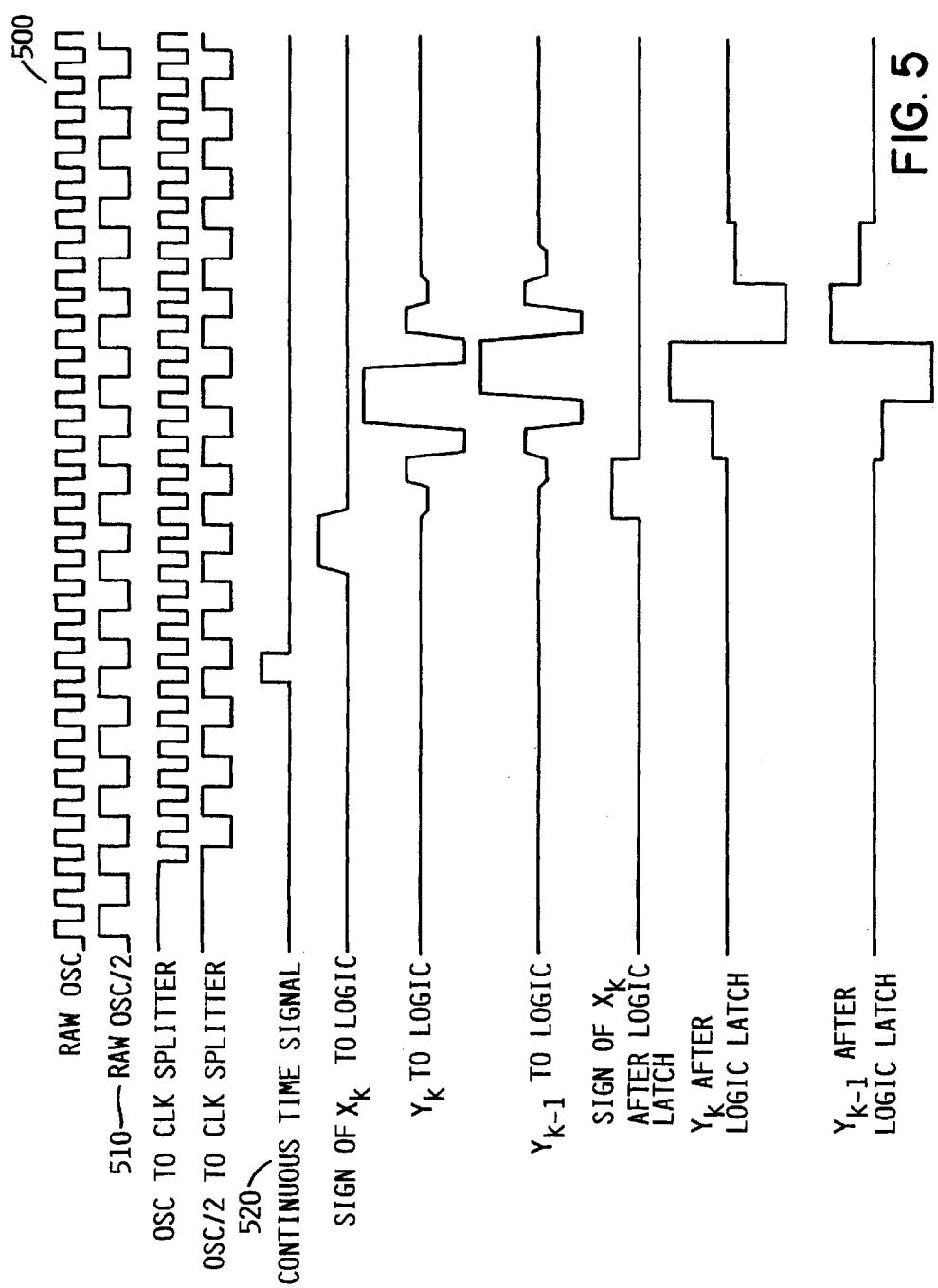
FIG. 5 illustrates that the circuit is clocked at half the bit rate.

FIG. 5 illustrates the analog path delays 500. The RAW OSC/2 signal 510 shows the oscillator running at half the bit rate. Thus, each clock cycle really represents 2 bits of delay. The continuous time signal 520 is the "sampled input signal" representing the time instance the input to the channel went non-zero. The other signals then show the delay relative to the continuous time signal 520.

Referring again to FIG. 3, the signs of $Y_n$ 328, $Y_{n-1}$ 326 and $X_n$ 316 events are processed through the delay paths 330, 332, 334 to produce the errors in the equalized output. The errors in the equalized output is actually the sign of the error of the equalized output 340, 342 and the $X_n$ events are the sign of the raw samples 344. The signs of the errors of the equalized output 340, 342 and the sign of the raw samples 344 are multiplied 350 for each of the eight different delays so that eight different accumulators 360 are going to all accumulate the gradients for each of the eight tap weights.

Figure 6:
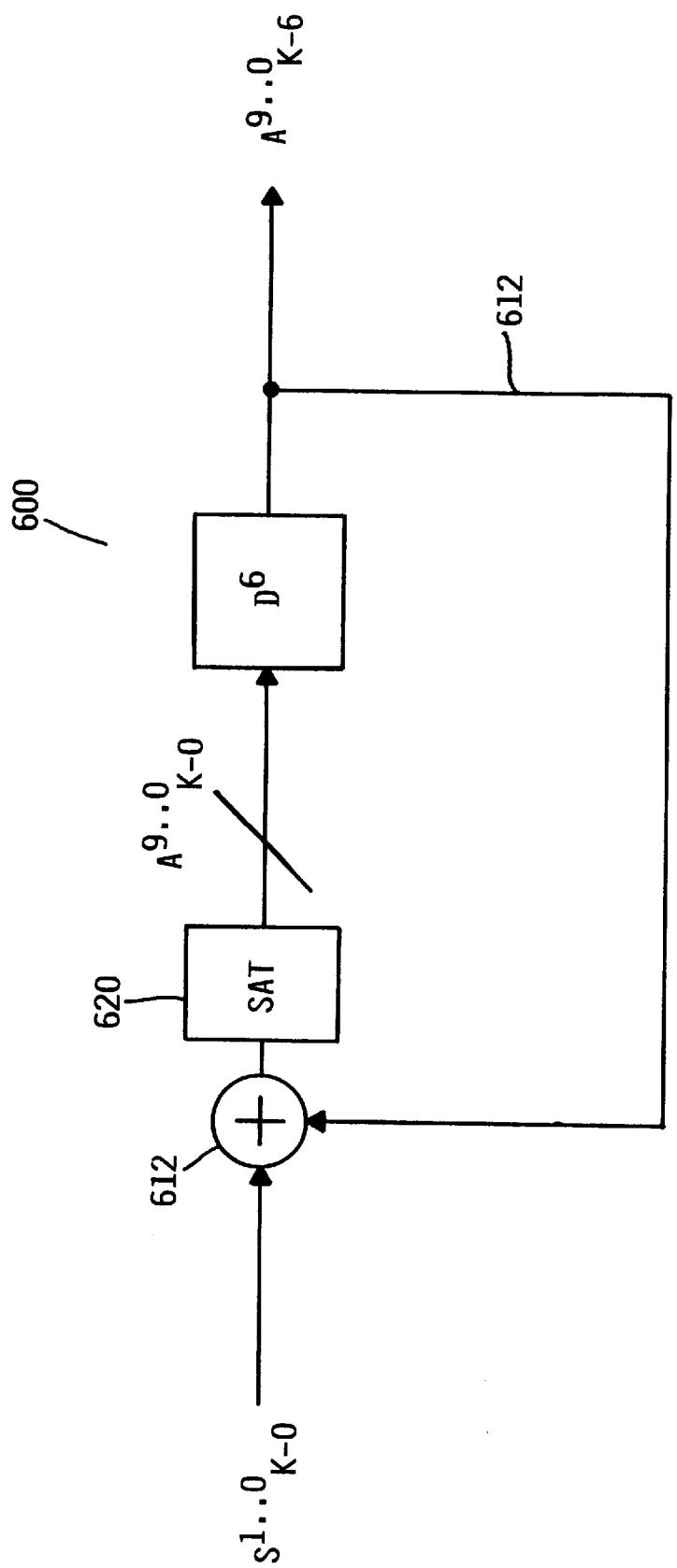
FIG. 6 illustrates the accumulator operation.

As a read operation is processed, the accumulators 360 are going to start at zero and they're going to accumulate the sign-sign product. FIG. 6 illustrates the operation of the accumulator 600. The accumulator includes an adder circuit 610 that feeds back 612 on itself and it has saturation protection 620 so that if it reaches the end, it doesn't roll over.

The optimum values of the tap weights are computed as shown below:

$$\text{Accumulator}(i) = \Sigma \text{ sign } X_{n-i} * \text{ sign } e_n,$$

where n ranges from 7 to N and i ranges from 0 to 7. There is an accumulator 600 for each tap weight. Because the sign product can only be a +1 or −1, the accumulator 600 increments by +1 if the sign product is positive and by −1 if the sign product is negative. If a FIR tap weight is near optimum, its accumulator 600 will sum up an equal number of minus and plus values and thus will be near zero in value once all the data values have flushed through the FIR filter. If on the other hand a tap is not optimum, then its accumulator 600 will be a large negative or positive number when done.

For example, the ideal values are the +2, 0 and −2. Thus, if the value of the equalized sample $Y_n$ has a value of +1 or greater, then the ideal value is assigned the value of +2. If the value of the equalized sample $Y_n$ is in the range of +1 to −1, then the ideal value is assigned a value of 0. Finally, if the value of the equalized sample $Y_n$ has a value of −1 or less, then the ideal value is assigned the value of −2. Then, the error signal, e.g. +0.1, is multiplied by each of the eight values of $X_n$. Thus, there are eight different products being computed in parallel to generate eight separate tap weights.

Referring again to FIG. 3, once the data has flushed through the FIR filter, a threshold value (not shown) is compared 370 to the count in each taps accumulator 360. If the count in the accumulator 360 is more positive than the threshold, then the tap weight associated with that accumulator 360 is reduced by 1 value. If the count in the accumulator 360 is more negative than the threshold, then the tap weight associated with that accumulator 360 is increased by 1 value. If there are no other constraints, then all the taps may change in value once its comparison 370 is complete.

However, the sum of the odd taps and the sum of the even taps in the present invention are constrained 380 over the entire equalization sequence. That means the odd or even taps must be moved in pairs which have opposite signs. Thus, tap values are modified only if a tap value to be modified can be paired with a tap value that is to be modified which maintains the sum for the odd taps and the sum of the even taps. The constraint logic 380 is discussed in more detail herein below.

Once the tap adjustments 382 have been made, the accumulators 360 are cleared and the next sector's worth of data is run through the FIR filter 310. This read, compare, adjust process continues until the equalization bit is disabled by an external process, e.g., the file central processing unit.

Figure 7A:
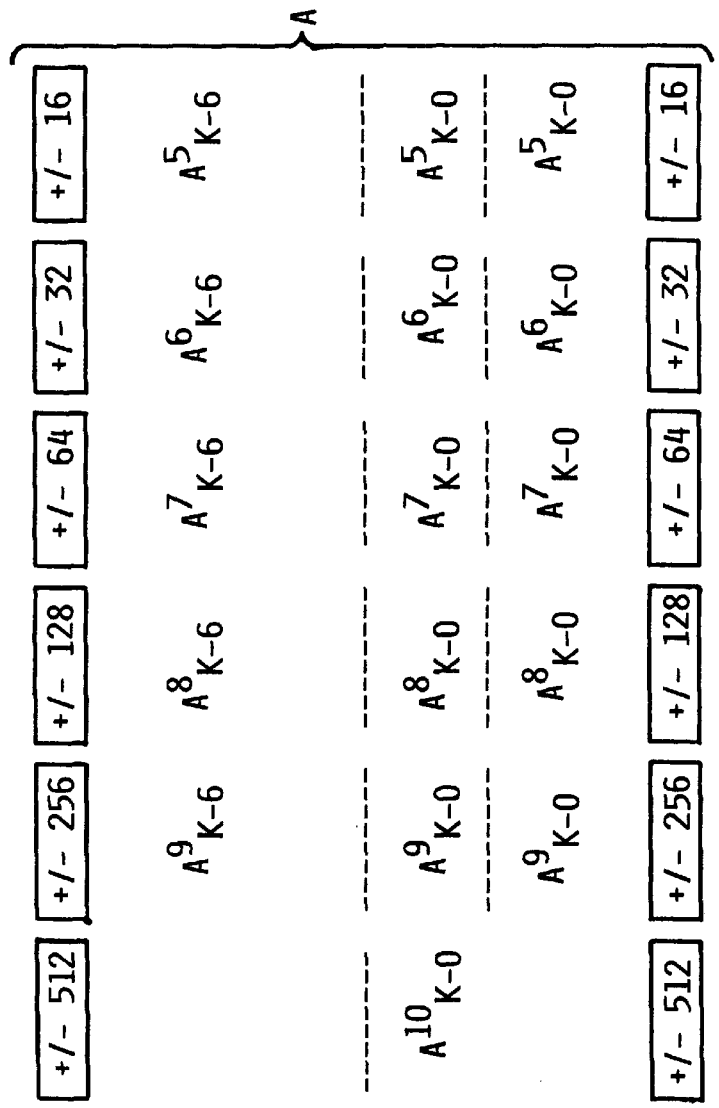
FIG. 7 illustrates the offset binary numbering system for controlling the adders.
Figure 7B:
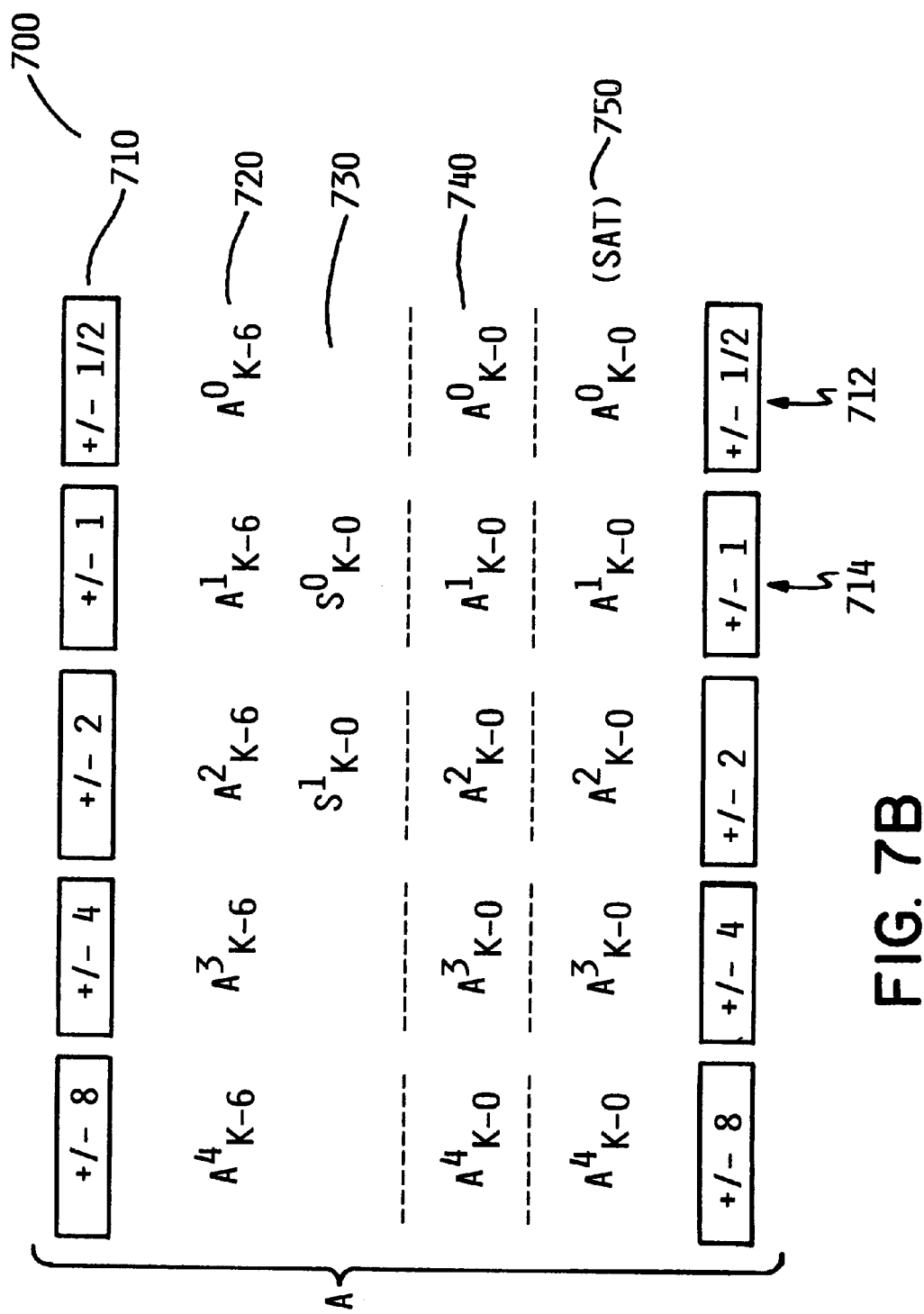

FIG. 7 illustrates the offset binary numbering system 700 for controlling the adders. The weighting of the bits are shown in the rectangular boxes 710 at the top and the bottom of FIG. 7. With offset binary, the value of zero cannot be represented. No matter what bit combination is used, true zero can never be presented. Offset binary provides an advantage, in that each bit represents an independent weighting. For example, if the LSB 712 were a 1, the LSB 712 would represent +½, where a zero for the LSB 712 would represent −½. For the bit above the LSB 714, A1, if it has a value of 1, then A1 714 represents a value of +1, and if it's a zero, it represents a −1. The first row 720 represent a 10-bit accumulator value 720 with a 2-bit value 730 being added to the accumulator. This is the result of the three-product sum. The first and second rows being added together result in the third row 740. Once the number is saturated so it doesn't overflow a 10-bit accumulator, the last line 750 represents the saturated value. Thus, the most positive number you can get is all ones, and the most negative you can get is all zeros.

Referring again to FIG. 3, at the end of the read, the 16 comparators 370 are going to determine whether the values in accumulators 360 were close to zero or above a positive threshold or below a negative threshold as described above. Thus, the output 372 of the comparators 370 indicated, for each tap weight, whether the tap wanted to move up, down or stay the same. Because the accumulators 360 represent the gradient, the comparators 370 indicate what adjustments to the tap weights are needed to cause the error signal to move up or down.

As mentioned above, constraint logic 380 is used to control the adjustments of the eight tap weights 382 such that all eight tap weights cannot be set independently. The constraint logic 380 provides two constraining equations that are followed. The two constraining equations are as follows:

$$-T_0+T_2-T_4+T_6=-71 \text{ 1sbs}$$

$$-T_1+T_3-T_5+T_7=-71 \text{ 1sbs}$$

Figure 8:
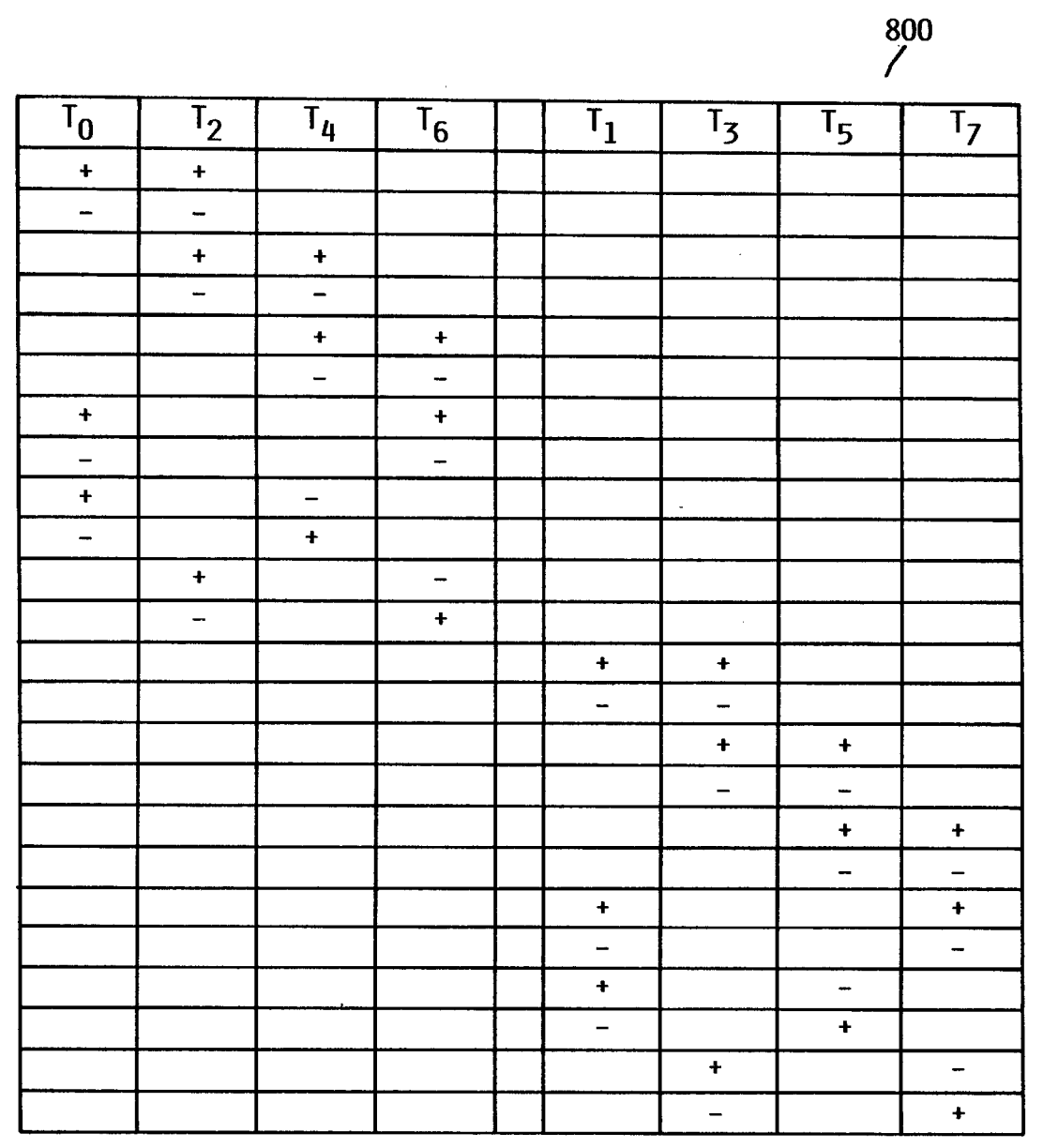

The adaptive equalization circuit maintains these constraints by ensuring that all tap weight adjustments 382 are performed in paired sets. Furthermore, both the even and odd sets of weights have to equal a constant. Thus, if any even tap weight is modified; the other even tap weights must be modified according to the sign relationship. For example, if $T_0$ is moved down, then either $T_2$ must be moved down, $T_4$ moved up, or $T_6$ moved down by the same amount so that that equation remains valid. FIG. 8 is a table 800 illustrating the 24 allowed adjustment combinations.

Returning again to FIG. 3, the output of the constraint logic 382 controls the tap modifications, $\Delta T_0$ through $\Delta T_7$, which are then fed to a tap modification 384 for modifying the taps being used. The output of the tap modification 384 is a memory 386 for storing the taps used in a read. However, while the read is going on the actual taps being used 314 are not changed. Thus, at the beginning of the read, a copy is made of the taps and put into separate memory called the "temp taps" 388. Thus, the temporary taps 388 are fed to the tap modification 384 and are modified in accordance with $\Delta \Delta T_0$ through $\Delta T_7$. At the end of the read operation, the new modified values replace the old value of the real taps.

Figure 9B:
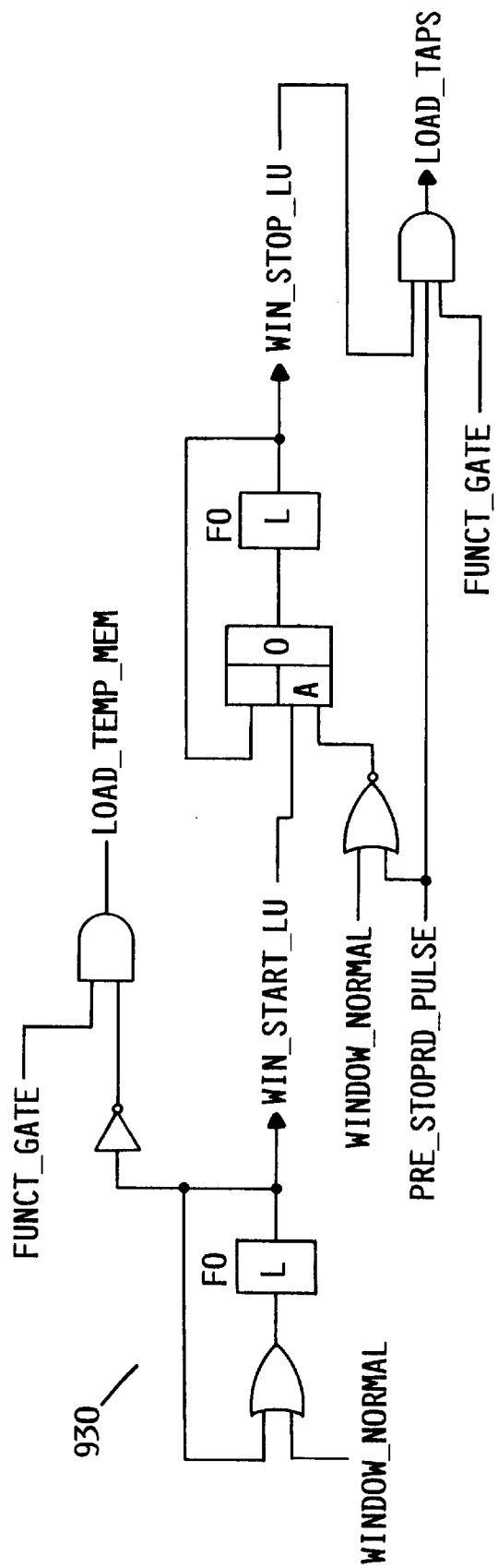
FIG. 9 illustrates the control signals for controlling the loading of the taps and the circuit for controlling the loading of the taps

Finally, FIG. 9 illustrates the control signals 910–924 for controlling the loading of the taps and the circuit 930 for controlling the loading of the taps. The pre-stop read pulse 914 indicates that there is a signal that goes high at the end of the read to tell the modified temporary taps to replace the real taps. The WINDOW NORMAL signal 916 forms a window that occurs in the middle of the read operation, which is controls the gating of the accumulators. After a read is started, the word sync must be determined. During this time, modifications to the taps are not allowed. Rather, after the word sync is determined, random data is being received. The adaptive equalizations need to adapt on random-looking data. Thus, a repeated pattern is not allowed. Therefore, the window start 918 and stop 920 form that window normal pulse 916. The load temp memory 922 is when the temporary taps get loaded. Then the load taps signal 924 instructs the modified temporary tap to replace the real taps. The stop read signal 912 indicates the termination of a read.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be not limited with this detailed description, but rather by the claims appended hereto.

What is claimed is:

1. A method for automating the convergence of tap weights in an equalizer, comprising:

obtaining a temporary copy of each of a plurality of current tap weights from a current tap weight memory;

determining a direction for modifying the temporary copy of each of the plurality of current tap weights;

constraining the modifications to the temporary copy of each of the plurality of current tap weights to produce adjusted tap weights, wherein the constraining comprises moving particular tap weights in pairs having opposite signs so that a sum of the particular tap weights is unchanged; and at the end of a read operation, storing the adjusted tap weights to the current tap weight memory for use during a next read operation.

2. The method of claim 1 wherein the determining further comprises:

calculating the sign-sign LMS products for each of the plurality of current tap weights;

summing the sign-sign LMS products for each of the plurality of current tap weights to produce a count; and comparing the count for each of the plurality of current tap weights to a threshold to produce a desired tap direction indicator for each of the plurality of current tap weights.

3. The method of claim 2 wherein the desired tap direction comprises a positive value if the count is more positive than the threshold and a negative value if the count is more negative than the threshold.

4. The method of claim 2 wherein the summing further comprises incrementing the count by +1 if the sign product is positive and by −1 if the sign product is negative.

5. The method of claim 1 wherein the constraining further comprises moving odd tap weights in pairs having opposite signs so that the sum of the odd tap weights is unchanged.

6. The method of claim 1 wherein the constraining further comprises moving even tap weights in pairs having opposite signs so that the sum of the even tap weights is unchanged.

7. The method of claim 1 wherein the constraining further comprises moving even tap weights according to:

$$-T_0+T_2-T_4+T_6=-71 \text{ lsbs},$$

wherein $T_i$ represents the ith tap, and wherein the tap weights are moved in pairs having opposite signs so that the sum of the even tap weights remains −71 lsbs.

8. The method of claim 1 wherein the constraining further comprises moving odd tap weights according to:

$$-T_1+T_3-T_5+T_7=-71 \text{ Isbs}$$

wherein $T_i$ represents the ith tap, and wherein the tap weights are moved in pairs having opposite signs so that the sum of the odd tap weights remains −71 Isbs.

9. A finite impulse response filter, comprising:

a delay line having N−1 delay latches for receiving a data signal and processing the data signal through the N−1 delay latches to produce N sampled signals at N taps;

N multipliers, coupled to the N taps of the delay line, for multiplying each of the N sampled signals by a corresponding Nth tap weight to produce a product signal;

an adder, coupled to the multiplier, for summing the product signals of the N multipliers to produce an equalized sample;

a subtractor, coupled to the adder, for subtracting an ideal equalized sample from the equalized sample to produce an error signal, the error signal being used to set the Nth tap weight for the N multipliers; and constraining logic coupled to the adder and subtractor, the constraining logic adjusting particular N tap weights in pairs having opposite signs so that a sum of the particular N tap weights is unchanged.

10. The filter of claim 9 further comprising a comparator for comparing the equalized sample to a threshold, the comparator producing an idealized equalized sample of +2 when the equalized sample is greater than +1, 0 when the equalized sample is not greater than +1 and not less than −1, and −2 when the equalized sample is less than −1.

11. The filter of claim 9 further comprising constraining logic, the constraining logic moving odd tap weights of the N tap weights in pairs having opposite signs so that the sum of the odd tap weights is unchanged.

12. The filter of claim 9 further comprising constraining logic, the constraining logic moving even tap weights of the N tap weights in pairs having opposite signs so that the sum of the even tap weights is unchanged.

13. The filter of claim 12 further comprising constraining logic, the constraining logic moving odd tap weights of the N tap weights in pairs having opposite signs so that the sum of the odd tap weights is unchanged.

14. The filter of claim 12 wherein the constraining logic constrains movement of even tap weights according to:

$$-T_0+T_2-T_4+T_6=-71 \text{ Isbs},$$

wherein $T_N$ represents the Nth tap, and wherein the tap weights are moved in pairs having opposite signs so that the sum of the even tap weights remains −71 Isbs.

15. The filter of claim 11 wherein the constraining logic constrains movement of odd tap weights according to:

$$-T_1+T_3-T_5+T_7=-71 \text{ Isbs}$$

wherein $T_i$ represents the ith tap, and wherein the tap weights are moved in pairs having opposite signs so that the sum of the odd tap weights remains −71 Isbs.

16. An adaptive equalizer, comprising: an analog finite impulse response filter having N tap weights, the analog finite impulse response filter receiving and processing data signals during a read operation to produce an equalized signal and a raw sample;

an error circuit, coupled to the analog finite impulse response filter, for processing the equalized signal to produce error signals;

N three product summers, coupled to the error circuit, for multiplying signs of the error signals and the raw sample to produce gradients for the plurality of tap weights;

N accumulators, coupled to the N three product summers, for accumulating the gradients of the N tap weights;

N comparators, coupled to the N accumulators, for comparing the accumulated gradients of the N tap weights and producing N direction of modification values;

constraining logic, coupled to the N comparators, for constraining the movement of the N tap weights within predetermined limits to produce N tap change values, the constraining logic adjusting particular N tap weights in pairs having opposite signs so that a sum of the particular N tap weights is unchanged; and a tap modifier, coupled to the constraining logic, for receiving a temporary copy of N current tap weights from a current tap weight memory and modifying the temporary copy of N current tap weights according to the N tap change values to produce N modified tap weights, the tap modifier loading the N modified tap weights into the current tap weight memory upon completion of the read operation.

17. The adaptive equalizer of claim 16 wherein the comparator produces an idealized equalized sample of +2 when the equalized sample is greater than +1, 0 when the equalized sample is not greater than +1 and not less than −1, and −2 when the equalized sample is less than −1.

18. The adaptive equalizer of claim 16 wherein the constraining logic moves odd tap weights of the N tap weights in pairs having opposite signs so that the sum of the odd tap weights is unchanged.

19. The adaptive equalizer of claim 16 wherein the constraining logic moves even tap weights of the N tap weights in pairs having opposite signs so that the sum of the even tap weights is unchanged.

20. The adaptive equalizer of claim 19 wherein the constraining logic moves odd tap weights of the N tap weights in pairs having opposite signs so that the sum of the odd tap weights is unchanged.

21. The adaptive equalizer of claim 19 wherein the constraining logic constrains movement of even tap weights according to:

$$-T_0+T_2-T_4+T_6=-71 \text{ Isbs},$$

wherein $T_N$ represents the Nth tap, and wherein the tap weights are moved in pairs having opposite signs so that the sum of the even tap weights remains −71 Isbs.

22. The adaptive equalizer of claim 18 wherein the constraining logic constrains movement of odd tap weights according to:

$$-T_1+T_3-T_5+T_7=-71 \text{ Isbs}$$

wherein $T_i$ represents the ith tap, and wherein the tap weights are moved in pairs having opposite signs so that the sum of the odd tap weights remains −71 Isbs.

* * * * *